US008660306B2

(12) United States Patent
Tu et al.

(10) Patent No.: US 8,660,306 B2
(45) Date of Patent: Feb. 25, 2014

(54) ESTIMATED POSE CORRECTION

(75) Inventors: Zhuowen Tu, Beijing (CN); Wei Shen, Wuhan (CN); Ke Deng, Sammamish, WA (US); Tommer Leyvand, Seattle, WA (US); Baining Guo, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 144 days.

(21) Appl. No.: 13/424,867

(22) Filed: Mar. 20, 2012

(65) Prior Publication Data

US 2013/0251192 A1    Sep. 26, 2013

(51) Int. Cl.
*G06K 9/00* (2006.01)
*H04N 5/225* (2006.01)
*G01R 21/00* (2006.01)

(52) U.S. Cl.
USPC .............................. 382/103; 348/169; 702/62

(58) Field of Classification Search
USPC ................ 382/103, 107, 131, 159, 190, 195; 348/169, 170, 171, 172; 702/62; 606/74, 105, 281, 909; 623/16.11, 623/18.11, 20.14; 403/39, 72, 76, 77, 78, 403/79, 80, 206, 333
See application file for complete search history.

(56) References Cited

U.S. PATENT DOCUMENTS

| 7,804,999 B2 * | 9/2010 | Zhou et al. ..................... 382/159 |
| 2009/0154796 A1 | 6/2009 | Gupta et al. |
| 2010/0278384 A1 | 11/2010 | Shotton et al. |

OTHER PUBLICATIONS

Wright, et al., "Robust Face Recognition via Sparse Representation", Retrieved at <<http://ieeexplore.ieee.org/stamp/stamp.jsp?tp=&arnumber=4483511>>, Proceedings: In IEEE Transactions on Pattern Analysis and Machine Intelligence, vol. 31, Issue 2, Feb. 2009, pp. 210-227.
Yang, et al., "Linear Spatial Pyramid Matching using Sparse Coding for Image Classification", Retrieved at <<http://ieeexplore.ieee.org/stamp/stamp.jsp?tp=&arnumber=5206757>>, Proceedings: In IEEE Computer Vision and Pattern Recognition, Jun. 20, 2009, pp. 1794-1801.
"Microsoft Corp. Kinect for XBOX 360", Retrieved at <<http://www.microsoft.com/en-us/news/press/2010/jul10/07-20Kinect PackagePR.aspx>>, Jul. 20, 2010, pp. 2.
Birnbaum, Allan., "A Unified Theory of Estimation", Retrieved at <<http://projecteuclid.org/DPubS/Repository/1.0/Disseminate?view=body&id=pdf_1&handle=euclid.aoms/1177705145>>, Proceedings: In Annals of Mathematical Statistics, vol. 32, No. 1, Mar. 1961, pp. 112-135.
Bourdev, et al., "Poselets: Body Part Detectors Trained Using 3D Human Pose Annotations", Retrieved at <<http://ieeexploreieee.org/stamp/stamp.jsp?tp=&arnumber=5459303>>, Proceedings: In IEEE 12th International Conference on Computer Vision, Sep. 29, 2009, pp. 1365-1372.

(Continued)

*Primary Examiner* — Abolfazl Tabatabai
(74) *Attorney, Agent, or Firm* — Judy Yee; Micky Minhas (57) ABSTRACT

Embodiments are disclosed that relate to the correction of an estimated pose determined from depth image data. One disclosed embodiment provides, on a computing system, a method of obtaining a representation of a pose of articulated object from image data capturing the articulated object. The method comprises receiving the depth image data, obtaining an initial estimated skeleton of the articulated object from the depth image data, applying a random forest subspace regression function to the initial estimated skeleton, and determining the representation of the pose based upon a result of applying the random forest subspace regression to the initial estimated skeleton.

20 Claims, 6 Drawing Sheets

(56) References Cited

OTHER PUBLICATIONS

Breiman, Leo., "Random Forests", Retrieved at <<http://medialab.tmit.bme.hu/targy_fileok/VITMM225/Slide/4.ealrodalomRandomForests.pdf>>, Proceedings: In Machine Learning, vol. 45, Issue 1, Oct. 2001, pp. 5-32.

Chang, et al., "LIBSVM: A Library for Support Vector Machines", Retrieved at <<http://www.csie.ntu.edu.tw/~cjlin/libsvm/>>, Proceedings: In AsCM Transactions on Intelligent Systems and Technology, vol. 2, Issue 3, Apr. 2011, pp. 4.

Comaniciu, et al., "Kernel-Based Object Tracking", Retrieved at <<http://ieeexplore.ieee.org/stamp/stamp.jsp?tp=&arnumber=1195991&userType=inst>>, Proceedings: In IEEE Transaction on Pattern Analysis and Machine Intelligence, vol. 25, Issue 5, May 2003, pp. 564-577.

Dollar, et al., "Behavior Recognition via Sparse Spatio-Temporal Features", Retrieved at <<http://ieeexplore.ieee.org/stamp/stamp.jsp?tp=&arnumber=1570899>>, Proceedings: In 2nd Joint IEEE International Workshop on Visual Surveillance and Performance Evaluation of Tracking and Surveillance, Oct. 15, 2005, pp. 65-72.

Dollar, et al., "Cascaded Pose Regression", Retrieved at <<http://vision.ucsd.edu/~pdollar/files/papers/DollarCVPR10pose.pdf>>, Proceedings: In IEEE Conference on Computer Vision and Pattern Recognition, Jun. 2010, pp. 1078-1085.

Gelfand, at al., "Sampling-Based Approaches to Calculating Marginal Densities", Retrieved at <<http://home.gwu.edu/~stroud/classics/GelfandSmith90.pdf>>, Proceedings: In Journal of the American Statistical Association, vol. 85, Issue 410, Jun. 1990, pp. 398-409.

Isard, et al., "Condensation—Conditional Density Propagation for Visual Tracking", Retrieved at <<http://www.cs.duke.edu/courses/cps296.1/spring05/handouts/Isard%20Blake%201998.pdf>>, Proceedings: In International Journal of Computer Vision, vol. 29, Issue 1, Aug. 1998, pp. 5-28.

Lee, et al., "Motion Fairing", Retrieved at <<http://citeseerx.ist.psu.edu/viewdoc/download;jsessionid=5B434C9A390DF1C2BB1B0AA52485038A?doi=10.1.1.37.8949&rep=rep1&type=pdf>>, Proceedings: In Proceedings of Computer Animation, Jun. 1996, pp. 136-143.

Lepetit, et al., "Randomized Trees for Real-Time Keypoint Recognition", Retrieved at <<http://ieeexplore.ieee.org/stamp/stamp.jsp?tp=&arnumber=1467521>>, Proceedings: In IEEE Computer Society Conference on Computer Vision and Pattern Recognition, vol. 2, Jun. 20, 2005, pp. 775-781.

Liaw, et al., "Classification and Regression by RandomForest", Retrieved at <<http://www.webchem.science.ru.nl/PRiNS/rF.pdf>>, Proceedings: In R News: The Newsletter of the R Project, vol. 2, Dec. 2002, pp. 18-22.

Lou, et al., "Example-based Human Motion Denoising", Retrieved at <<http://faculty.cs.tamu.edu/jchai/projects/tvcg09/tycg_final.pdf>>, Proceedings: In IEEE Transactions on Visualization and Computer Graphics, vol. 16, Issue 5, Sep. 2010, pp. 1-11.

Niebles, et al., "Modeling Temporal Structure of Decomposable Motion Segments for Activity Classification", Retrieved at <<http://vision.stanford.edu/documents/NieblesChenFei-Fei_ECCV2010.pdf>>, Proceedings: In Proceedings of the 11th European Conference on Computer Vision, Part 2, vol. 6312, Sep. 2010, pp. 392-405.

Peduzzi, et al., "A Simulation Study of the Number of Events per Variable in Logistic Regression Analysis", Retrieved at <<http://facmed.univ-rennes1.fr/wkf//stock/RENNES20100407100014blaviolllogistic1.pdf>>, Proceedings: In Journal of Clinical Epidemiology, vol. 49, Issue 12, Dec. 1996, pp. 1373-1379.

Quinlan, J.R., "Induction of Decision Trees", Retrieved at <<http://www.dmi.unict.it/~apulvirenti/agd/Qui86.pdf>>, Proceedings: In Journal Machine Learning, vol. 1, No. 1, Mar. 1986, pp. 81-106.

Rasmussen, et al., "Gaussian Processes for Machine Learning (GPML) Toolbox", Retrieved at <<http://jmlr.csail.mit.edu/papers/volume11/rasmussen10a/rasmussen10a.pdf>>, Proceedings: In Journal of Machine Learning Research, vol. 11, Nov. 2010, pp. 3011-3015.

Rasmussen, et al., "Gaussian Processes for Machine Learning", Retrieved at <<http://www.gaussianprocess.org/gpml/chapters/RW.pdf>>, Proceedings: In MIT Press, May 2006, pp. 266.

Scholkopf, et al., "New Support Vector Algorithms", Retrieved at <<http://citeseerx.ist.psu.edu/viewdoc/download?doi=10.1.1.2.6040&rep=rep1&type=pdf>>, Proceedings: In Journal of Neural Computation, vol. 12, Issue 5, May 2000, pp. 1208-1245.

Tak, et al., "A Physically-based Motion Retargeting Filter", Retrieved at <<http://graphics.snu.ac.kr/research/mrf/2005%20Tak%20ACM%20TOG.pdf>>, Proceedings: In ACM Transactions on Graphics, vol. 24, Issue 1, Jan. 2005, pp. 98-117.

Assouad, et al., "Plongements Lipschitziens Dans Rn", Retrieved at <<http://archive.numdam.org/ARCHIVE/BSMF/BSMF_1983_111_/BSMF_1983_111_429_0/BSMF_1983_111_429_0.pdf>>, Retrieved Date: Apr. 27, 2012, pp. 429-448.

Bentley, Jon Louis., "Multidimensional Divide-and-Conquer", Retrieved at <<http://www.cs.uiuc.edu/class/fa05/cs473ug/hw/p214-bentley.pdf>>, Proceedings: In Communications of the ACM, vol. 23, Issue 4, Apr. 1980, pp. 214-229.

Breiman, Leo., "Bagging Predictors", Retrieved at <<http://www.machine-learning.martinsewell.com/ensembles/bagging/Breiman1996.pdf>>, Proceedings: In Machine Learning, vol. 24, Issue 2, Aug. 1996, pp. 123-140.

Breiman, Leo., "Random Forests", Retrieved at <<http://www.lri.fr/~aze/enseignements/bibs/2007-2008/articles/randomForest-Breiman_ML2001.pdf>>, Proceedings: In Machine Learning, vol. 45, Issue 1, Oct. 2001, pp. 5-32.

Candes, et al., "Near Optimal Signal Recovery From Random Projections: Universal Encoding Strategies?", Retrieved at <<http://arxiv.org/pdf/math/0410542v2.pdf>>, Proceedings: IEEE Transactions on Information Theory, vol. 52, No. 2, Apr. 3, 2005, pp. 1-39.

Caruana, et al., "An Empirical Evaluation of Supervised Learning in High Dimensions", Retrieved at <<http://icml2008.cs.helsinki.fi/papers/632.pdf>>, Proceedings: In 25th International Conference on Machine Learning, Jul. 5, 2008, pp. 96-103.

Caruana, et al., "An Empirical Comparison of Supervised Learning Algorithms", Retrieved at <<http://citeseerx.ist.psu.edu/viewdoc/download?doi=10.1.1.122.5901&rep=rep1&type=pdf>>, Proceedings: In 23rd International Conference on Machine Learning, Jun. 25, 2006, pp. 161-168.

Chen, et al., "Rapid Inference on a Novel and/or Graph for Object Detection, Segmentation and Parsing", Retrieved at <<http://people.csail.mit.edu/leozhu/paper/InferenceNips07E.pdf>>, Proceedings: In Twenty-First Annual Conference on Neural Information Processing Systems, Dec. 3, 2007, pp. 1-8.

Dasgupta, et al., "Random Projection Trees and Low Dimensional Manifolds", Retrieved at <<http://citeseerx.ist.psu.edu/viewdoc/download?doi=10.1.1.117.3236&rep=rep1&type=pdf>>, Proceedings: In Proceedings of the 40th Annual ACM Symposium on Theory of Computing, May 17, 2008, pp. 537-546.

Everingham, et al., "The 2005 Pascal Visual Object Classes Challenge", Retrieved at <<http://eprints.pascal-network.org/archive/00001212/01/voc11.uk.pdf>>, Proceedings: In Selected Proceedings of the First PASCAL Challenges Workshop, Retrieved Date: Apr. 27, 2012, pp. 65.

Ferrari, et al., "Accurate Object Detection with Deformable Shape Models Learnt from Images", Retrieved at <<http://ieeexplore.ieee.org/stamp/stamp.jsp?tp=&arnumber=4270068>>, Proceedings: In IEEE Conference on Computer Vision and Pattern Recognition, Jun. 17, 2007, pp. 1-8.

Freund, et al., "Learning the Structure of Manifolds using Random Projections", Retrieved at <<http://citeseerx.ist.psu.edu/viewdoc/download?doi=10.1.1.143.8688&rep=rep1&type=pdf>>, Proceedings: In Proceedings of the Twenty-First Annual Conference on Neural Information Processing Systems, vol. 20, Dec. 3, 2007, pp. 1-8.

Freund, et al., "A Decision-Theoretic Generalization of On-Line Learning and an Application to Boosting", Retrieved at <<http://citeseer.ist.psu.edu/viewdoc/

(56) References Cited

OTHER PUBLICATIONS download;jsessionid=59C3DB12C162144E6183EA6881A05FDD?doi=10.1.1.32.8918&rep=rep1&type=pdf>>, Proceedings: In Journal of Computer and System Sciences, vol. 55, Issue 1, Aug. 1997, pp. 1-35.

Friedman, et al., "Pathwise Coordinate Optimization", Retrieved at <<http://arxiv.org/pdf/0708.1485.pdf>>, Proceedings: In the Annals of Applied Statistics, vol. 1, No. 2, Dec. 14, 2007, pp. 302-332.

Gao, et al., "Local Features are not Lonely—Laplacian Sparse Coding for Image Classification", Retrieved at <<http://ieeexplore.ieee.org/stamp/stamp.jsp?tp=&arnumber=5539943>>, Proceedings: In IEEE Computer Vision and Pattern Recognition, Jun. 13, 2010, pp. 3555-3561.

Geurts, Pierre., "Extremely Randomized Trees", Retrieved at <<http://a.zw00.com/viewdoc/download;jsessionid=C7498288D0AC91790F5E6D5C6CD336AD?doi=10.1.1.3.390&rep=rep1&type=pdf>>, Proceedings: In Technical Report of Machine Learning, vol. 36, Jun. 2003, pp. 1-10.

Lazebnik, et al., "Beyond Bags of Features: Spatial Pyramid Matching for Recognizing Natural Scene Categories", Retrieved at <<http://ieeexplore.ieee.org/stamp/stamp.jsp?tp=&arnumber=1641019>>, Proceedings: In IEEE Computer Vision and Pattern Recognition, vol. 2, Jun. 17, 2006, pp. 2169-2178.

Lee, et al., "Efficient Sparse Coding Algorithms", Retrieved at <<http://citeseer.ist.psu.edu/viewdoc/download?doi=10.1.1.69.2112&rep=rep1&type=pdf>>, Proceedings: In Twenty-First Annual Conference on Neural Information Processing Systems, vol. 19, Issue 2, Dec. 3, 2007, pp. 8.

Li, et al., "Coordinate Descent Optimization for $\ell$ 1 Minimization with Application to Compressed Sensing; a Greedy Algorithm", Retrieved at <<http://archive.numdam.org/ARCHIVE/BSMF/BSMF_1983_111_/BSMF_1983_111_429_0/BSMF_1983_111_429_0.pdf>>, Proceedings: In Commission on Applied Mineralogy, Retrieved Date: Apr. 30, 2012, pp. 19.

Mairal, et al., "Task-Driven Dictionary Learning", Retrieved at <<http://ieeexplore.ieee.org/stamp/stamp.jsp?tp=&arnumber=5975166>>, Proceedings: In IEEE Transactions on Pattern Analysis and Machine Intelligence, vol. 34, Issue 4, Apr. 2012, pp. 791-804.

Moosmann, et al., "Randomized Clustering Forests for Image Classification", Retrieved at <<http://ieeexplore.ieee.org/stamp/stamp.jsp?tp=&arnumber=4384498>>, Proceedings: In IEEE Transactions on Pattern Analysis and Machine Intelligence, vol. 30, Issue 9, Sep. 2008, pp. 1632-1646.

Opelt, et al., "Generic Object Recognition with Boosting", Retrieved at <<http://ieeexplore.ieee.org/stamp/stamp.jsp?tp=&arnumber=1580486>>, Proceedings: In IEEE Transactions on Pattern Analysis and Machine Intelligence, vol. 28, Issue 3, Mar. 2006, pp. 416-431.

Quinlan, J. Ross., "Induction of Decision Trees", Retrieved at <<http://www.dmi.unict.it/~apulvirenti/agd/Qui86.pdf>>, Proceedings: In Machine Learning, vol. 1, No. 1, Mar. 1986, pp. 81-106.

Shotton, et al., "Semantic Texton Forests for Image Categorization and Segmentation", Retrieved at <<http://ieeexplore.ieee.org/stamp/stamp.jsp?tp=&arnumber=4587503>>, Proceedings: In IEEE Computer and Pattern Recognition, Jun. 23, 2008, pp. 1-8.

Tibshirani, Robert., "Regression Shrinkage and Selection via the Lasso", Retrieved at <<http://algomagic.s3.amazonaws.com/algomagic_1f64_lasso.pdf>>, Proceedings: In Journal of the Royal Statistical Society, vol. 58, Issue 1, Retrieved Date: Apr. 30, 2012, pp. 267-288.

Turk, et al., "Eigenface for Recognition", Retrieved at <<http://www.face-rec.org/algorithms/PCA/jcn.pdf>>, Proceedings: In Journal of Cognitive Neuroscience, vol. 3, No. 1, Retrieved Date: Apr. 30, 2012, pp. 16.

Uno, et al., "Efficient Construction of Neighborhood Graphs by the Multiple Sorting Method.", Retrieved at <<http://arxiv.org/pdf/0904.3151.pdf>>, Proceedings: In Journal of Machine Learning Research, Apr. 21, 2009, pp. 15.

Vedaldi, et al., "VLFeat: An Open and Portable Library of Computer Vision Algorithms", Retrieved at <<http://www.vlfeat.org/>>, Retrieved Date: Apr. 30, 2010, pp. 2.

Wang, et al., "Locality Constrained Linear Coding for Image Classification", Retrieved at <<http://ieeexplore.ieee.org/stamp/stamp.jsp?tp=&arnumber=5540018>>, Proceedings: In Computer Vision and Pattern Recognition, Jun. 13, 2010, pp. 3360-3367.

Geng, et al., "Automatic Tracking, Feature Extraction and Classification of C. elegans Phenotypes", Retrieved at <<http://ieeexplore.ieee.org/stamp/stamp.jsp?tp=&arnumber=1337149>>, IEEE Transactions on Biomedical Engineering, No. 10, vol. 51, Oct. 2004, pp. 1811-1820.

Shotton, et al., "Real-Time Human Pose Recognition in Parts from Single Depth Images", Retrieved at <<http://ieeexplore.ieee.org/stamp/stamp.jsp?tp=&arnumber=5995316>>, IEEE Conference on Computer Vision and Pattern Recognition (CVPR), Jun. 25, 2011, pp. 1297-1304.

Tuzel, et al., "Learning on lie groups for invariant detection and tracking", Retrieved at <<http://ieeexplore.ieee.org/stamp/stamp.jsp?tp=&arnumber=4587521>>, IEEE Conference on Computer Vision and Pattern Recognition, CVPR, Jun. 28, 2008, pp. 1-8.

Kanaujia, Atul, "Conditional Models for 3D Human Pose Estimation", Retrieved at <<http://mss3.libraries.rutgers.edu/dlr/outputds.php?pid=rutgers-lib:26536&mime=application/pdf&ds=PDF-1>>, A dissertation submitted to the Graduate School—New Brunswick Rutgers, The State University of New Jersey, Jan. 2010, pp. 206.

Zhao, et al., "Human Motion Tracking by Temporal-Spatial Local Gaussian Process Experts", Retrieved at <<http://ieeexplore.ieee.org/stamp/stamp.jsp?tp=&arnumber=5575422>>, IEEE Transactions on Image Processing, vol. 20, No. 4, Apr. 4, 2011, pp. 1141-1151.

* cited by examiner

ESTIMATED POSE CORRECTION

BACKGROUND

The development of high-speed depth cameras has provided an opportunity for the application of a practical imaging modality to the building of a variety of systems in gaming, human computer interaction, surveillance, and other fields. For example, estimations of human pose determined via depth images acquired by such cameras may be used as input for computing systems and/or applications. As a more specific example, video games may utilize depth images of players as inputs to control game play.

Human poses may be estimated in various manners, such as via classification-based methods. However, poses determined via such methods may be prone to error due, for example, to pose variation and body part occlusion.

SUMMARY

Embodiments are disclosed herein that relate to the correction of an estimated pose determined from depth image data. For example, one embodiment provides, on a computing system, a method of obtaining a representation of a pose of articulated object from image data capturing the articulated object. The method comprises receiving the depth image data, obtaining an initial estimated skeleton of the articulated object from the depth image data, applying a random forest subspace regression function to the initial estimated skeleton, and determining the representation of the pose based upon a result of applying the random forest subspace regression to the initial estimated skeleton.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As mentioned above, estimations of human pose (or other articulated object pose) from depth images may be used as input for many types of computing systems and applications. To ensure proper performance of such systems and applications, it is desirable for such pose estimations to be robust. However, initial pose estimation from raw depth data using, for example, classification-based approaches may be prone to error due to large pose variation and body part occlusion. As such, additional processing, which may be referred to as pose correction, may be performed to recover the pose from such a noisy initial estimation. Pose correction of various types may be performed, such as skeletal correction and pose tag assignment. Skeletal correction attempts to recover skeletal pose (e.g. by recovering the location of joints of the skeleton from an initial estimate of joint location), while pose tag assignment outputs a value within a range (e.g. a real value ranging from 0 to 1) indicating a particular location of the pose along a movement pathway.

Pose correction may be performed in various manners. For example, some classification-based methods may utilize a nearest neighbor approach in which distances between an experimental point and training set points are calculated, and the nearest training set point is used as the classification for the experimental point. However, a nearest neighbor approach may utilize heuristics to a larger than desired extent.

Thus, embodiments are disclosed herein that may provide a more data-driven approach to pose correction than nearest neighbor or other methods. The disclosed embodiments utilize random forest regression methods to perform pose correction on an estimated skeleton. Briefly, a random forest regression function is trained to learn errors that occur in the initial skeleton estimation. In the case of skeletal correction, a regression function is trained to learn the systematic errors in initial joint estimation, while in tag correction, a regression function is trained to learn pose tag values directly. A random forest regression function also may utilize subspace learning, such that leaf nodes in the decision trees of the random forest regression function each comprises a set of bases that sparsely represent a subspace at the leaf node. In addition to being more data-driven than nearest neighbor methods and other regression methods, random forest regression methods also may be more efficient when processing larger amounts of training data and/or when utilizing features of higher dimensions in a training set.

Figure 1:
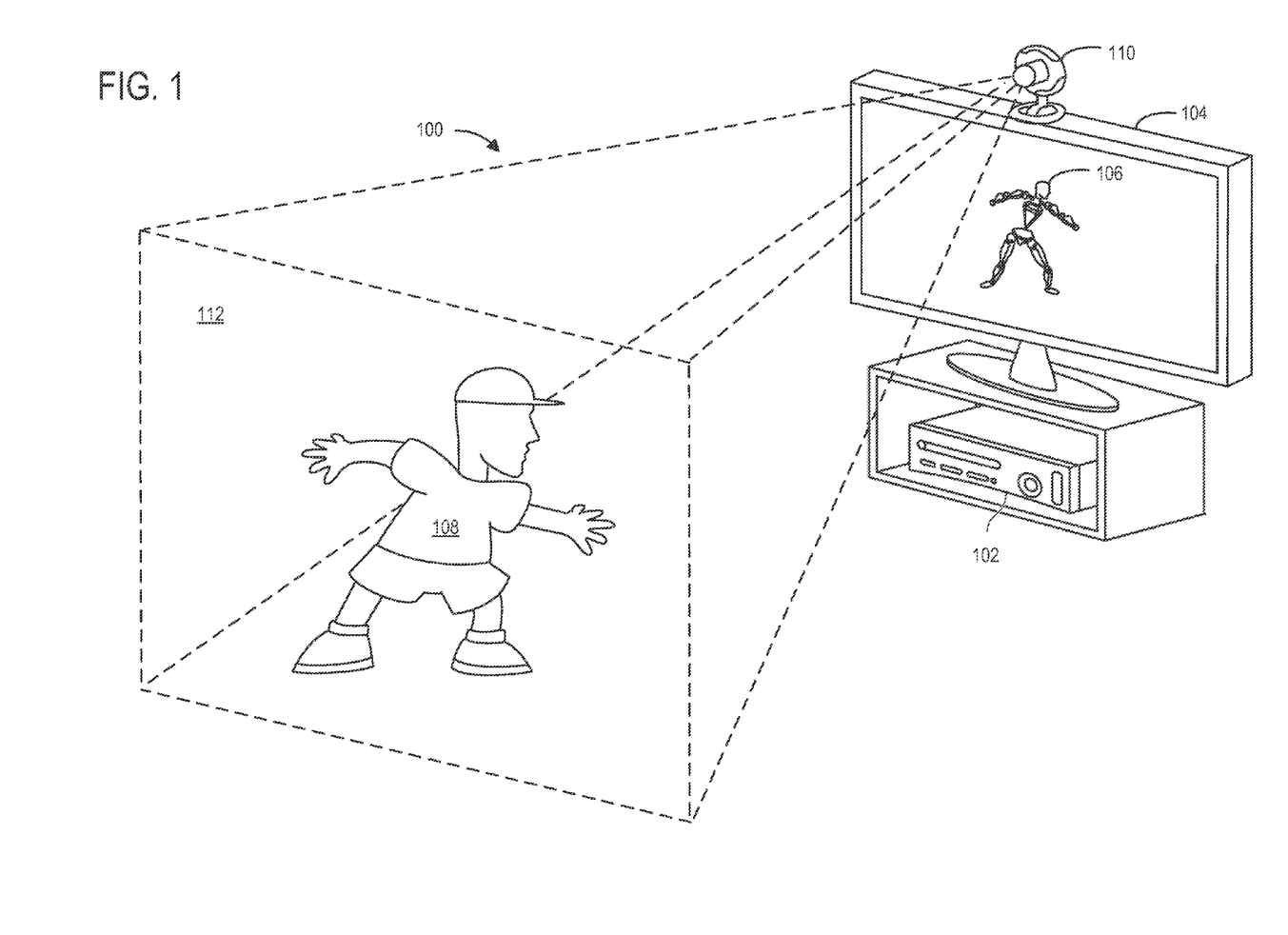
FIG. 1 shows an embodiment of a depth camera in an example use environment.

Prior to discussing these embodiments in more detail, an example use environment is described with reference to FIG. 1. The use environment comprises a computing system in the form of a gaming system 102 that may be used to play a variety of different games, play one or more different media types, and/or control or manipulate non-game applications and/or operating systems. FIG. 1 also shows a display device 104 such as a television or a computer monitor, which may be used to present game visuals to game players. As one example, display device 104 may be used to visually present a virtual avatar 106 that human target 108 controls with his movements. The gaming system 102 may be included as part of a depth-image analysis system 100 that may include a capture device, such as a depth camera or other depth sensor 110, that visually monitors or tracks human target 108 within an observed scene 112. The gaming system 102 may receive depth image data from the depth sensor 110 and may perform depth image analysis on the depth image data.

Human target 108 is shown here as a game player within the observed scene 112. Human target 108 is tracked by depth camera 110 so that the movements of human target 108 may be interpreted by gaming system 102 as controls that can be used to affect the game being executed by gaming system 102. In other words, human target 108 may use his or her movements to control the game. The movements of human target 108 may be interpreted as any suitable type of game control. Some movements of human target 108 may be interpreted as controls that serve purposes other than controlling virtual avatar 106. As nonlimiting examples, movements of human target 108 may be interpreted as controls that steer a virtual racing car, shoot a virtual weapon, navigate a first-person perspective through a virtual world, or manipulate various aspects of a simulated world. Movements may also be interpreted as auxiliary game management controls. For example, human target 108 may use movements to end, pause, save, select a level, view high scores, communicate with other players, etc.

Depth camera 110 may also be used to interpret target movements as operating system and/or application controls that are outside the realm of gaming. Virtually any controllable aspect of an operating system and/or application may be controlled by movements of human target 108. The illustrated scenario in FIG. 1 is provided as an example, but is not meant to be limiting in any way. To the contrary, the illustrated scenario is intended to demonstrate a general concept, which may be applied to a variety of different applications without departing from the scope of this disclosure.

The methods and processes described herein may be tied to a variety of different types of computing systems. FIG. 1 shows a nonlimiting example in the form of gaming system 102, display device 104, and depth camera 110. In general, a depth-image analysis system may include a computing system, shown in simplified form in FIG. 6, which will be discussed in greater detail below.

Figure 2:
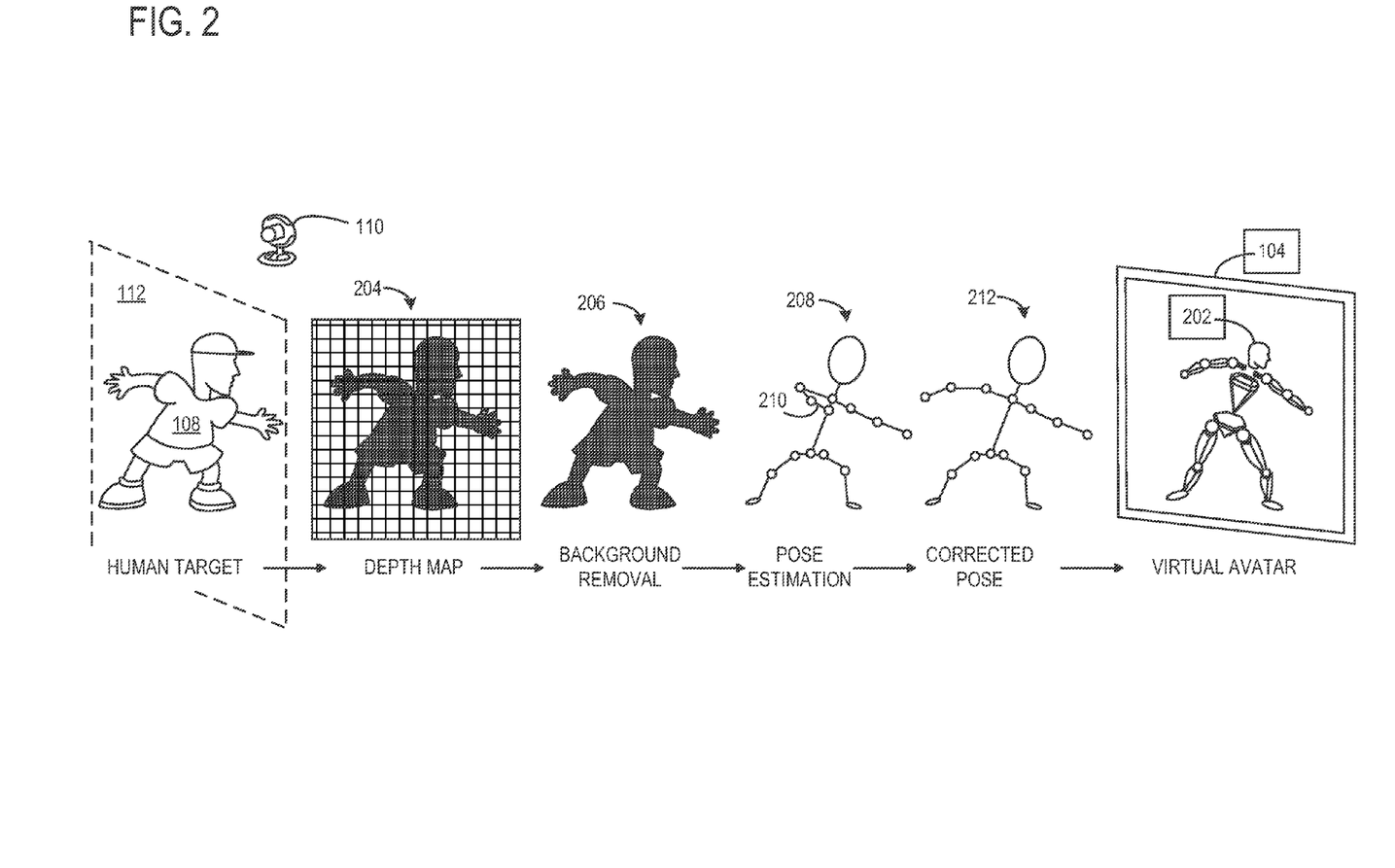
FIG. 2 shows an embodiment of a pose analysis pipeline.
Figure 3:
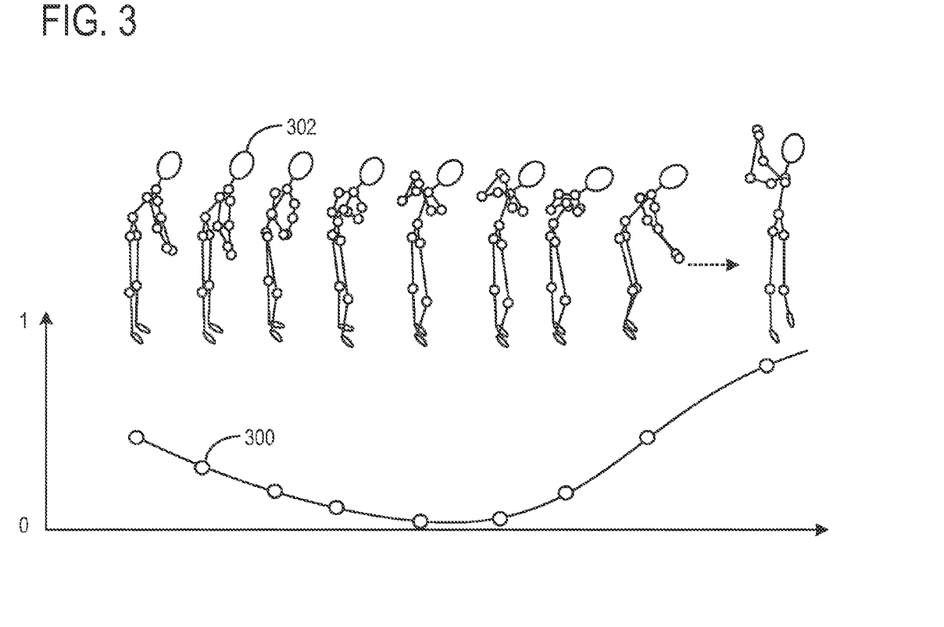
FIG. 3 shows a graph illustrating a pose tag value compared to an estimated skeleton according to an embodiment of the present disclosure.

FIG. 2 shows an example embodiment of a processing pipeline in which human target 108 is modeled as a virtual skeleton 200 that can be used to draw a virtual avatar 106 on display device 104 and/or serve as a control input for controlling other aspects of a game, application, and/or operating system based upon the pose and movement of the skeleton. As mentioned above, a pose of human target 108 also may be represented as a pose tag value instead of as a skeleton in some instances. A graphical representation of a set of pose tags 300 is shown in FIG. 3 as points along a line, wherein different phases of a golf swing are assigned values between 0 and 1 such that the pose of an avatar 302 is signified by the pose tag value. It will be understood that the depicted representation of pose tag values compared to a path of motion are presented for the purpose of example, and are not intended to be limiting in any manner.

As shown in FIG. 2, human target 108 and the rest of observed scene 112 may be imaged by a capture device such as depth camera 110. The depth camera may determine, for each pixel, the depth of a surface in the observed scene relative to the depth camera. Any suitable depth finding technology may be used without departing from the scope of this disclosure.

The depth information determined for each pixel may be used to generate a depth map 204. Such a depth map may take the form of any suitable data structure, including but not limited to a matrix that includes a depth value for each pixel of the observed scene. It is to be understood that a depth map generally includes depth information for all pixels, not just pixels that image the human target 108. Thus, in some embodiments, background removal algorithms may be used to remove background information from the depth map 204, producing a background-free depth map 206.

After background removal, an initial estimated skeleton 208 is derived from the background-free depth map 206. Initial estimated skeleton 208 may be derived from depth map 204 to provide a machine readable representation of human target 108. Initial estimated skeleton 208 may be derived from depth map 204 in any suitable manner. For example, in some embodiments, one or more skeletal fitting algorithms may be applied to the background-free depth map 206. The present disclosure is compatible with any suitable skeletal modeling techniques.

Initial estimated skeleton 208 may include a plurality of joints, each joint corresponding to a portion of the human target 108. It will be understood that an initial estimated skeleton in accordance with the present disclosure may include any suitable number of joints, each of which can be associated with any suitable number of parameters (e.g., three dimensional joint position, joint rotation, body posture of corresponding body part (e.g., hand open, hand closed, etc.) etc.). It is to be understood that an initial estimated skeleton may take the form of a data structure including one or more parameters for each of a plurality of skeletal joints (e.g., a joint matrix including an x position, a y position, a z position, and a rotation for each joint). In some embodiments, other types of virtual skeletons may be used (e.g., a wireframe, a set of shape primitives, etc.).

Figure 4:
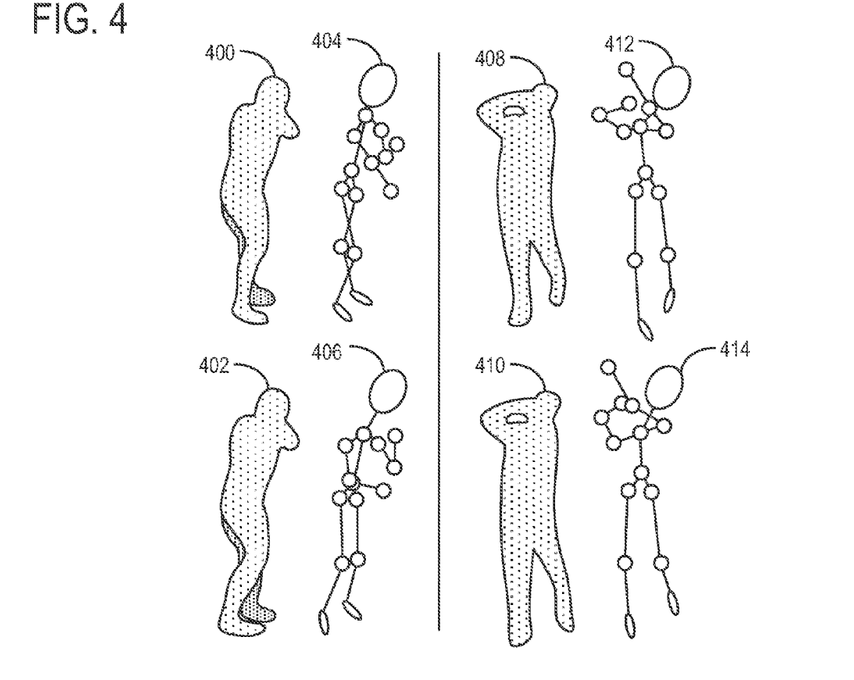
FIG. 4 shows example systematic estimated pose errors according to an embodiment of the present disclosure.

Initial estimated skeleton 208 may contain various errors, for example due to occlusion of body parts by other body parts, as illustrated by arm position error 210. FIG. 4 shows examples of errors in initial pose estimation that may arise from occlusion as users performs golf club swing gestures in front of a depth camera. Referring first to the left-hand side of FIG. 4, the user left-side arms of depth images 400 and 402 are severely occluded by other body parts of the users in the depth images, and the right-side forearms are less severely occluded. The initial estimated skeletons for each of these players, represented at 404 and 406 respectively, illustrate errors that arise in the estimation of the locations of the joints of these arms. Next referring to the right-hand side of FIG. 4, the right-side forearms of the users depth images 408 and 410 are occluded, which gives rise to errors in the estimation of the right arm joints in each of the resulting estimated skeletons, shown respectively at 412 and 414.

Thus, a pose correction process may be performed on the initial estimated skeleton to obtain a corrected pose. The pose correction may be used to form a corrected skeleton, as shown at 212, to assign a pose tag 300, or to correct pose in any other suitable manner. In general, to perform pose correction from a noisy initial estimated skeleton, two types of information may be used: temporal motion consistency and systematic bias. While temporal motion consistency has received much attention, less attention has been paid to systematic bias. Systematic biases may be non-linear and associated with complex data manifolds. The bias estimation problem observes two properties: (1) human action has certain regularity, especially when some actions, e.g. golf or tennis, are performed, and (2) the bias is not homogeneous in the data manifold. For example, when a person is facing the camera with no occlusion, the initial estimates may be quite accurate. On the other hand, when a person is standing in a side-view with certain hand motion, there is severe occlusion, and the initial estimation may not be correct, as described above with reference to FIG. 4.

The learning and use of a random forest regression function for pose correction may offer various advantages in the correction of systematic errors in initial pose estimation. Briefly, a random forest regression function is a function that utilizes a plurality of random splitting/projection decision trees trained via a set of training data to classify input data. In some embodiments, for each leaf node in the tree, a set of bases is learned to represent the data with sparse coefficients (within a subspace, constraints in sparsity may give rise to a more efficient representation). The overall codebook is the set of all bases from all leaf nodes of the trees. After training, observed data may be input into each random decision tree of the random forest regression function, and a result may be selected based upon a most frequent outcome of the plurality of trees.

A random forest approach may be well-suited for correcting systematic errors in initial estimated pose. For example, random forest regression techniques implement ensemble learning, divide-and-conquer techniques, and sparse coding, which are beneficial properties in light of the high dimensionality of initial estimated pose data. Random forest regression techniques implement these properties via voting, randomizing, partitioning, and sparsity. Ensemble learning is implemented through the use of multiple decision trees. Divide-and-conquer techniques are implemented via the use of decision trees, in which training data are recursively partitioned into subsets. Dividing training data into subsets may help solve difficulties in fitting the overall training data to a global mode. Further, the voting/averaging of multiple independent and/or complementary weak learners (e.g. individual decision trees that together make up a decision forest) helps to provide robustness compared to other correction methods. Further robustness may arise from certain randomness in the data and feature selection stage of training the random forest regression function. Finally, sparse representation of the bases may allow high-dimensional data within intrinsic lower dimension to be well represented by sparse samples of high dimension, wherein the robustness of the sparse representation may assume a subspace of a level of regularity, such as well-aligned data.

Figure 5:
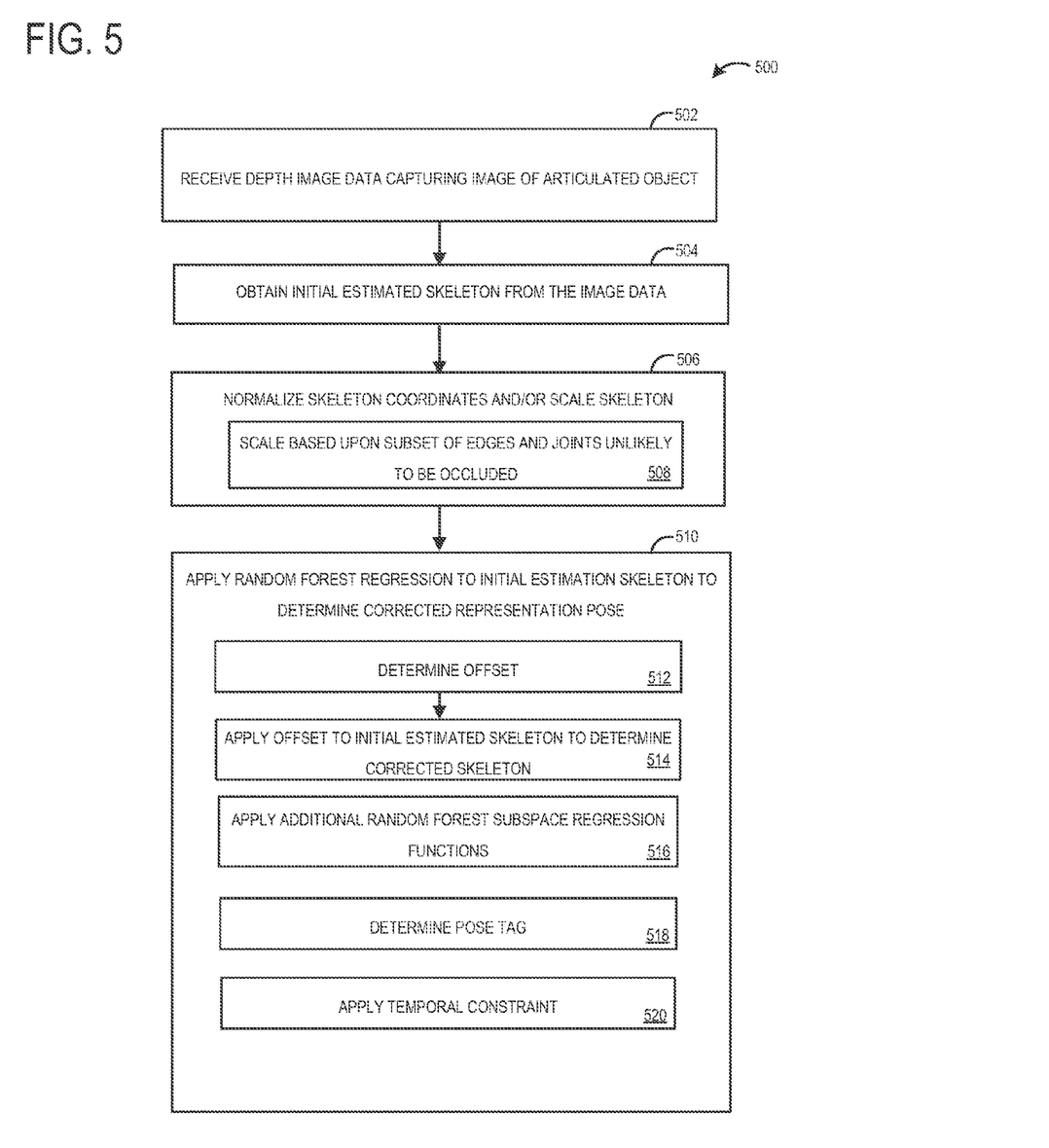
FIG. 5 shows a flow diagram depicting an embodiment of a method for correcting an initial estimated pose via a random forest subspace regression.

FIG. 5 shows a flow diagram illustrating an embodiment of a method of correcting an initial estimated skeleton utilizing a random forest subspace regression function. Method 500 comprises, at 502, receiving depth image data capturing an image of an articulated object, such as a person. The depth image data may comprise any suitable depth image data, including but not limited to time-of-flight data and structured light pattern data. Next, at 504, method 500 comprises obtaining an initial estimated skeleton from the image data. Obtaining the initial estimated skeleton may involve various processes. For example, as described above, a background region of the depth image data may be removed, and a classification method may be used to fit the skeleton to the depth map of the person detected.

Next, in some embodiments, method 500 may comprise, at 508, normalizing and/or scaling the initial estimated skeleton. This may help to correct for skeletal translation and individual body differences. Such normalizing and/or scaling may be performed in any suitable manner. For example, the initial estimated skeletons shown in FIG. 4 take the form of a directed graph having twenty joints represented by nodes of the graph. Given an initial estimated skeleton $ST=(\hat{x}_j, c_j; j=1, \ldots, n)$ where $c_j$ is a confidence value of the estimated position of joint j (e.g. $c_j=1$ if confidence is high, and 0 if confidence is low), normalized coordinates for such an initial estimated skeleton may be represented as $H(ST)=(r_j, c_j; j=1, \ldots, n)$. As $\hat{x}_j$ denotes the world coordinate, the coordinates may be normalized to a template to remove global translation and correct for variation in individual body differences. In one example, a skeletal joint corresponding to a central hip location (e.g. at the base of the spine and the origin of the legs) may be used as an origin $r_1=(0; 0; 0)$, and the other joints may be mapped as $$r_j = \frac{x_j - x_{jo}}{\|x_j - x_{jo}\|_2},$$

where joint $j_o$ is a direct predecessor of joint j on the directed graph representing the skeleton. The design of the transformed coordinates H(ST) is motivated by the kinematic body joint motion. H(ST) observes a certain level of invariance to translation, scaling, and individual body changes. It will be understood that this embodiment of a method for normalizing the joint coordinates of an initial estimated skeleton is presented for the purpose of example, and that any other suitable method may be used. Further, in some embodiments, such normalization may be omitted.

As mentioned above, scaling of the initial estimated skeleton also may be performed. For example, scaling may be performed in embodiments in which skeletal correction is performed by inferring an offset of skeletal joints between the initial estimated skeleton ST and a ground truth skeleton GT, instead of directly predicting the locations of the joints in the corrected skeleton. Predicting the offset of joints may offer various advantages over directly predicting joint locations. As mentioned above, it will be noted that, when a user is facing a depth camera with no occlusion, ST may actually be very accurate, and therefore have nearly zero difference compared to GT. In contrast, when a person is in side view of the depth camera, severe occlusions may exist, which may lead to a large and inhomogeneous difference between ST and GT. The correction of ST is thus a manifold learning problem. As a result, certain clusters of ST on the manifold can be directly mapped to, e.g., very low values when predicting offsets, while predicting direct coordinates of GT based upon ST may involve exploring all possible ST in the data space.

Scaling of an initial estimated may be performed in any suitable manner. For example, in some embodiments, initial estimated skeletons may be normalized based upon default lengths of the edges between nodes in a template skeleton. To help avoid scaling errors caused by body part occlusion, this may involve selecting a subset of joints unlikely to be occluded, as indicated at 508 to use for such a scaling process. Such joints also may be referred to as stable joints, a set of which may be denoted as $J_s$. Examples of such stable joints include, but are not limited to, joints in the spine of the initial estimated skeleton, central joints in the shoulder and/or hip, as well as joints in the legs. In comparison, joints such as hand and wrist joints may be more likely to be occluded. Thus, edges between these joints may be prone to errors.

Next, for each skeleton edge between the stable joints and direct predecessor joints, a proportion to the template skeleton edge length may be computed as $$\lambda(j, j_o) = \frac{\|\hat{x}_j - \hat{x}_{jo}\|_2}{\|T_j - T_{jo}\|_2},$$

where $T_j$ is the jth joint for the template T, which may be fixed. Then, the scale proportion of the initial estimated skeleton is $$\lambda(ST) = \frac{\sum_{j \in J_s}(\lambda(j, j_o) \cdot \delta(\left\|\lambda(j, j_o) - \frac{\Sigma\lambda(j_o, j)}{|J_s|}\right\|_1 \leq th))}{\sum_{j \in J_s}\delta(\left\|\lambda(j, j_o) - \frac{\Sigma\lambda(j_o, j)}{|J_s|}\right\|_1 \leq th)},$$

where $\delta(\bullet)$ is an indicator function that is a robust measure to exclude outliers, and where $$th = 3\sqrt{\frac{\sum_{j \in J_s}\left(\lambda(j, j_o) - \frac{\sum \lambda(j_o, j)}{|J_s|}\right)^2}{|J_s|}}.$$

Continuing with FIG. 5, method 500 next comprises, at 510, applying a random forest subspace regression function to the scaled and normalized initial estimated skeleton ST. In the instance of skeletal correction, a joint offset may be computed, as shown at 516-518, while in pose tag assignment, a pose tag may be assigned, as shown at 520.

An embodiment of the process of skeletal correction is as follows. Given a training set $\{ST_i, GT_i\}$, where $ST_i$ and $GT_i$ are the initial estimated skeleton and ground truth respectively, a random forest subspace regression function $f$: ST→D, may be trained, where $\Delta$ is the offset of ST from GT and $\lambda$ is the above-described scale factor to be used for normalizing the initial estimated skeleton. After training the function, an offset $\Delta$ may be determined for an observed initial estimated skeleton using this function, as indicated at 516. The offset $\Delta$ may then be added to the initial estimated skeleton, as indicated at 518 to obtain a corrected pose in the form of a corrected skeleton.

As a more detailed example, the offset $\Delta_j$ for a joint j may be expressed as $$\Delta_j = \frac{(x_j - \hat{x}_j)}{\lambda(ST)},$$

where $D=(\Delta_1, \ldots, \Delta_n)$ for each skeleton of n joints. For an entire sequence of m images, $d=(D_1, \ldots, D_m)$ From the offsets, the corrected skeleton CT may be determined by $CT=ST+\lambda f(ST)$.

The random forest subspace regression function $f$: ST→D may be trained in any suitable manner. For example, a training set may be represented by $S=\{(st,gt)_k\}$ for k=1 through K (where st and gt represent the initial estimated skeleton and ground truth for that initial estimated skeleton). For simplicity, K=1 in this discussion. From the coordinate normalization described above, one may obtain $h(st)=(H(ST_1), \ldots, H(ST_m))$, where each $H(ST)=(r_j,c_j; j=1, \ldots, n)$. Using the offset computation $\Delta_j$, the offset $d=(D_1, \ldots, D_m)$ may be computed. Thus, the goal is to predict the mapping h(st)→d.

First, a function is learned to directly predict the mapping f: H(ST)→D by making the independent assumption of each pose. From this view, the training set may be rewritten as $S=(H(ST_i), D_i)$ for i=1 to m. As mentioned above, a random forest regression function includes an ensemble of tree predictors that naturally perform data partitioning, abstraction, and robust estimation. For the task of regression, tree predictors take on vector values, and the forest votes for the most possible value. Each tree in the forest comprises split nodes and leaf nodes. Each split node stores a feature index with a corresponding threshold ti to decide whether to branch to the left or right sub-tree, and each leaf node stores predictions.

To learn the random forest regression function $f$: H(ST)→D, following a greedy tree training algorithm, each tree in the forest is learned by recursively partitioning the training set into left $S_l$ and right $S_r$ subsets according to a best splitting strategy $$\theta^* = \arg\min_\theta \sum_{p \in \{l,r\}} \frac{|S_p(\theta)|}{|S|} e(S_p(\theta)),$$

where e(•) is an error function standing for the uncertainty of the set, and $\theta$ is a set of splitting candidates. If a number of training samples corresponding to the node (node size) is larger than a maximal $\kappa$, and $$\sum_{p \in \{l,r\}} \frac{|S_p(\theta^*)|}{|S|} e(S_p(\theta^*)) < e(S)$$

is satisfied, then recurse for the left and right subsets $S_l(\theta^*)$ and $S_r(\theta^*)$, respectively.

Any suitable error function may be selected. One example is the simple standard tree node splitting function comprising the root mean squared differences, which may be expressed as $$e(S) = \sqrt{\frac{\sum_{i=1}^{m} \left\| D_i - \frac{\sum_{i=1}^{m} D_i}{|S|} \right\|_2^2}{m}}.$$

In the training stage, once a tree t is learned, a set of training samples $$S_t^{lf} = \{D_i^{lf}\}_{i=1}^{|S_t^{lf}|}$$

would fall into a particular leaf node lf. Instead of storing all of the samples $S_t^{lf}$ for each leaf node lf, an abstraction may be performed. For example, one method may comprise storing the mean $\overline{D}^{(lf)}=\Sigma_i D_i^{lf}/|S_t^{lf}|$ of the set $S_t^{lf}$. It will be understood that this example of an abstraction is presented for the purpose of example, and that other abstractions may be performed as well. As another example, a histogram of $S_t^{lf}$ may be stored. In addition, each tree t would assign a leaf node label $L_t(H(ST_i))$ for a given $H(ST_i)$.

In the testing stage, given a test example $ST=(\hat{x}_j,c_j; j=1, \ldots, n)$, for each tree t, the training process begins at the root, then recursively branches left or right. The test example then reaches the leaf node $L_t(H(ST))$ in tree t. The prediction given by tree t is $F_t(H(ST))=\delta(lf=L_t(H(ST)))\cdot\overline{D}^{(lf)}$, where $\delta(\bullet)$ is an indicator function. The final output of the forest of T trees is a probability function, as follows:

$$P_{H(ST)}(D) = \frac{1}{T}\sum_{t=1}^{T} \delta(D = F_t(H(ST))).$$

The mean may be considered as another output of the learned regression function $f(H(ST)) E_{P_{H(ST)}}[D]$, where $E_{P_{H(ST)}}[\bullet]$ indicates the expectation. The corrected skeleton may be obtained by $CT=ST^-+\lambda(ST)\cdot f(H(ST))$, where $ST^-=(\hat{x}_j,c_j; j=1, \ldots, n)$ and the components in CT comprise $CT=(z_j; j=1, \ldots, n)$.

Any suitable type of random forest function may be used. Examples include, but are not limited to, extremely randomized trees (ERTs) and random projection trees (RPTs). ERTs randomize both the feature selection and the quantization threshold searching process, which may help to make the trees less correlated. The samples (image patches) in each leaf node are assumed to form a small cluster in the feature space. The leaves in the forest are uniquely indexed and serve as the codes for the codebook. When a query sample reaches a leaf node, the index of that leaf is assigned to the query sample. A histogram then may be formed by accumulating the indices of the leaf nodes.

A RPT, which is a variant of k-d tree, splits the data set along one coordinate at the median and recursively builds the tree. Based on the realization that, high dimension data often lies on low-dimensional manifold, RPT splits the samples into two roughly balanced sets according to a randomly generated direction. This randomly generated direction approximates the principal component direction, and can adapt to the low dimensional manifold. The RPT naturally leads to tree-based vector quantization, and an ensemble of RPTrees can be used as a codebook.

In embodiments that implement sparse representation of leaf node bases, instead of splitting each sample until the sample cannot be split anymore, splitting may be stopped early. Then, a set of bases may be identified that provide a robust reconstruction of the samples in that node, wherein the identified bases may serve as the codes of the codebook. One possible advantage of sparse coding via random forest functions compared to other sparse coding techniques (e.g. vector quantization, spatial pyramid matching, Laplace sparse coding) is efficiency. Utilizing random forest techniques, the sparse coding is performed in subspaces, which may reduce the computational burden. Another possible advantage is the potential promotion of the discriminative ability, as label information may be used in the tree splitting process, which may allow the resulting codebook to have more discriminative power.

A random forest subspace regression with sparse representation of bases at leaf nodes may be represented in any suitable manner. One example is as follows. Given a set of training data $S=\{x_i\}_{i=1}^n$ and $x_i \in R^D$, in a supervised setting, each $x_i$ is also associated with a label $y_i \in Y=\{0, \ldots, K\}$. Thus, $S=\{(x_i, y_i)\}_{i=1}^n$. The goal is to learn a codebook B comprising a set of bases, wherein $B=\{b_i\}_{i=1}^m$ and $b \in R^D$ such that $$\min_{B,w} \sum_{i=1}^n \left\| x_i - \sum_{j=1}^m w_{ij} b_j \right\|_2^2,$$

and such that $\forall i, \Sigma_j |w_{ij}| \leq \Sigma$. The first term in this equation minimizes the reconstruction error, and the second term gives the sparsity constraints on the reconstruction coefficients. In codebook learning, each $b_j$ serves as a code, and the reconstruction coefficients with respect to the codes are pooled to form a histogram.

In this equation, the norm of $b_j$ may be arbitrarily large, making $w_i$ arbitrarily small. Thus, further constraints may be imposed on $b_j$. For example, a constraint may be made that all of the bases in the codebook be from the training set S. With this constraint, the equation above regarding the set of bases may be transformed into $$\min_{v,w} \sum_{i=1}^n \left\| x_i - \sum_{j=1}^n w_{ij} v_j x_j \right\|_2^2,$$

such that $\Sigma_j v_j \leq m$, $v_j \in \{0, 1\}$, and $\forall i, \Sigma_j |w_{ij}| \leq \tau$. Here, $v_j$ serves as an indicator value that is a member of the set $\{0, 1\}$, and $B=\{x_j: x_j \in S, v_j=1\}$. While $v_j$ may add additional complexity, it also may allow the search space to be greatly reduced.

After an optimal basis set $B^*$ is found, for a new sample x, reconstruction coefficients w may be computed via $$\min_w \left\| x - \sum_{j=1}^m w_j b_j \right\|_2^2$$

that $\Sigma_j |w_{ij}| \leq \tau$. The vector w can be used to characterize the sample x.

While learning a codebook of size greater than, for example, 5,000 from tens of thousands of samples may be computationally demanding, data of real-world complexity may live in complex manifolds. Thus, a divide-and-conquer strategy to partition the data into local subspaces may allow the more efficient learning of basis within a subspace for a sparse representation.

As mentioned above, any suitable random forest regression method may be used to learn a codebook for pose correction, including but not limited to ERT and RPT. Both ERT and RPT partition samples recursively in a top-down manner. ERT adopts the label information and uses normalized Shannon entropy as a criterion to select features. In contrast, RPT is unsupervised and does not utilize label information. Instead, it splits the data via a hyperplane normalized to each individual randomly generated projection bases.

Both ERT and RPT may build the trees to a fine scale and use the leaf nodes as codes. However, as mentioned earlier, instead of building the trees to a very deep level, random forest sparse coding (RFSC) for use in a random forest subspace regression may stop at some relatively higher level (for example, when the number of samples is less than M). At such nodes, the local manifold structure is assumed to be relatively simple and regularized. RFSC seeks a set of bases to sparsely represent the subspaces at those nodes. As one non-limiting example, when the splitting process stops, there may be approximately 80-200 samples (depending upon codebook size) and approximately 3-10 bases per leaf node. Thus, the computational overhead of subspace learning may not be significant compared with directly pursuing bases from the entire sample set.

In some embodiments, a plurality of random forest subspace regression functions may be performed in a cascaded manner, as indicated in FIG. 5 at 516. In such an embodiment, such regression functions may be trained in an iterative manner. One embodiment of such a cascaded regression is as follows. First, the regression function $f: H(ST) \rightarrow D$ may be rewritten as $f^{(0)}: H(ST) \rightarrow D^{(0)}$. Then the corrected skeleton $CT^{(1)}$ may be obtained by $CT^{(1)} = ST^- + \lambda(ST) \cdot f^{(0)}(H(ST))$. The normalized skeleton joint coordinates $H(CT^{(1)})$ may be computed as described above, and then a second regression function may be learned, wherein the second regression function may be expressed as $f^{(1)}: (H(ST), H(CT^{(1)})) \rightarrow D^{(1)}$, where $D^{(1)}$ is the offset between $CT^{(1)}$ and GT. The corrected skeleton (generalized to i regression functions, where i=1 in this example) may then be obtained by $CT^{(i+1)} = CT(i) + \lambda(ST) \cdot f^{(i)}(H(ST), H(CT^{(i)}))$.

Figure 6:
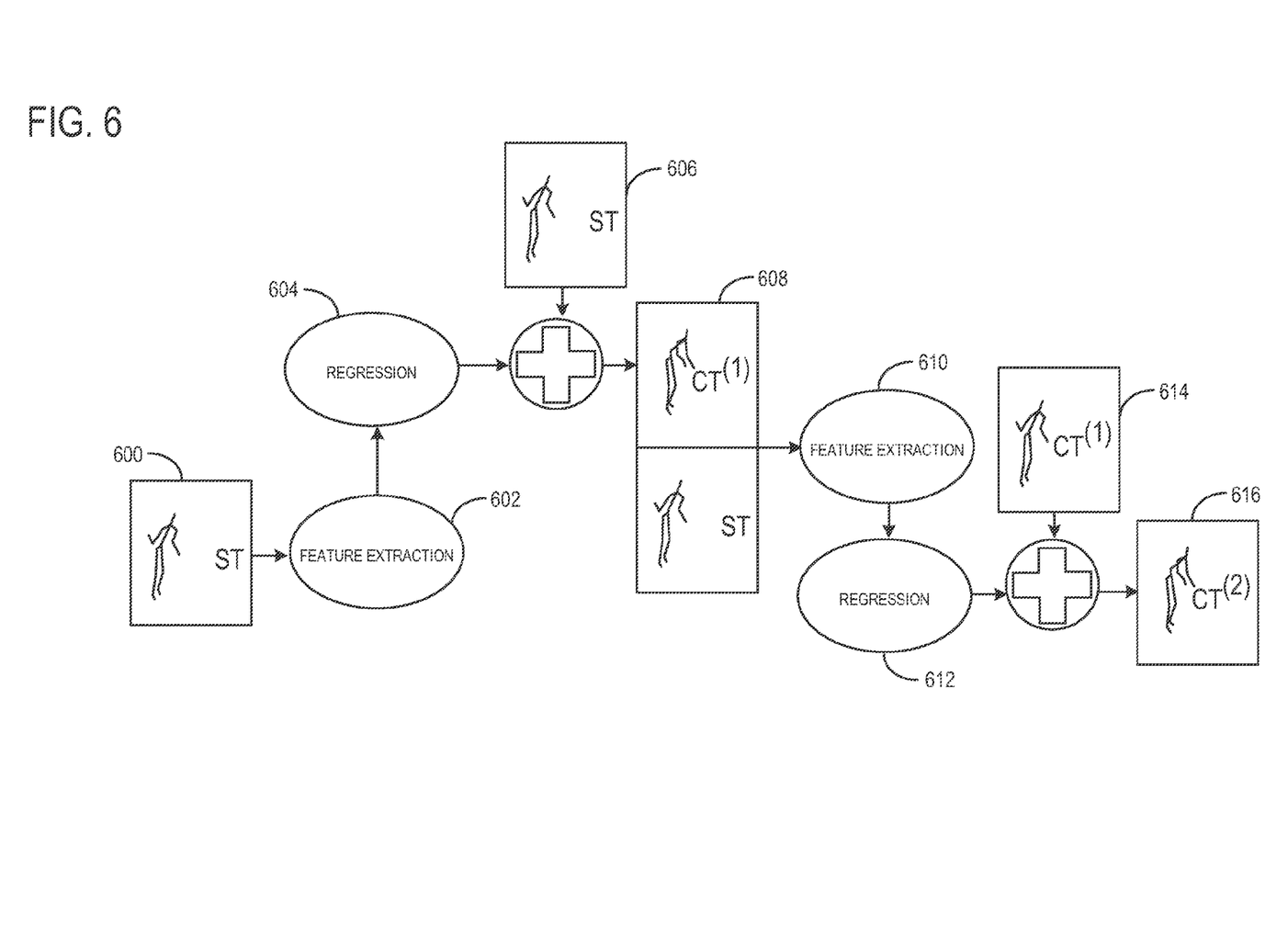
FIG. 6 shows a flow diagram illustrating an embodiment of utilizing cascading regression functions to determine a corrected skeleton.

FIG. 6 graphically represents an example embodiment of such a process. An initial estimated skeleton shown at 600 first passes through a feature extraction stage 602 (e.g. joint normalization and/or scaling), and then through a first random forest regression stage 604. An offset determined by this stage is then added to the initial estimated skeleton (input of which is illustrated at 606) to produce the first corrected skeleton 608. The first corrected skeleton and the initial estimated skeleton are then used as inputs into a second feature extraction stage 610 and regression stage 612. The second regression stage 612 produces an offset that is added to the first corrected skeleton (or potentially the initial estimated skeleton in some embodiments). The input of the first corrected skeleton is shown at 616. This calculation produces the second corrected skeleton, which may be closer to the ground truth skeleton than the first corrected skeleton.

As mentioned above, pose correction also may be utilized to directly assign a pose tag based upon an initial estimated skeleton. This is shown at 518 in FIG. 5. A random tree subspace regression function for pose tag assignment may be learned the manner described above for skeletal correction, except that the offset D in the expressions above is replaced by the tag value $\Gamma_i$. As such, the random forest subspace regression function learned has the form f: $H(ST) \rightarrow \Gamma_i$. In such a function, each leaf node in tree t also stores a representation of the tag values in that leaf node, such as the mean tag value.

In some embodiments, motion consistency may be taken into account to assist in pose correction by applying a temporal constraint, as indicated at 520 in FIG. 5. For example, as a pose tag takes the form of a point on the manifold of a coherent motion, a temporal constraint may be particularly useful in helping to predict tag value. It will be understood that temporal constraints also may be used to assist in skeletal correction.

A temporal constraint may be applied in any suitable manner. For example, in the instance of pose tag assignment, to add a temporal constraint, a mean shift may be applied to seek multiple modes $\{\Gamma\}$ from the votes of the trees. Considering the multiple modes of nth frame are $\{\Gamma^{(n)}\}$, a mode $\Gamma^{*(n)}$ may be selected such that $$\Gamma^{*(n)} = \begin{cases} \mathrm{argmax} h_p(\Gamma^{(n)}), \text{ if } n = 1 \\ \mathrm{argmax} \alpha h_s(\Gamma^{(n)}) + (1-\alpha) h_p(\Gamma^{(n)}), \text{ otherwise} \end{cases}$$

where $\alpha$ is a weight factor, $h_p(\Gamma^{(n)})$ is the probability mass function of $\Gamma^{(n)}$ and $$h_s(\Gamma^{(n)}) = \exp\left(-\frac{1}{2} \frac{\|\Gamma^{(n)} - \Gamma^{*(n-1)}\|_2^2}{\sigma}\right),$$

where $\sigma$ is s the tolerable variance between two successive frames.

A temporal constraint may be applied to a skeletal correction process in a similar manner. For example, where real-time calculation is desired, one approach may follow a causal model, such that a current prediction depends on past/current inputs/outputs. In such a model, for the ith input estimated skeleton $ST_i$, its offset may be computed as $$D_i = \begin{cases} f(H(ST_i)) \text{ if } i = 1 \\ \mathrm{argmin}_{D \in R^{n \times 3}} E(D \mid ST_i, ST_{i-1}, D_{i-1}), \text{ otherwise} \end{cases}$$

where $E(\bullet)$ is an energy function defined as $$E(D|ST_i, ST_{i-1}, D_{i-1}) = \alpha(-\log(P_{H(ST_i)}(D))) + (1+\alpha)\|ST_i^- + \lambda(ST_i)D - (ST_{i-1}^- + \lambda(ST_{i-1})D_{i-1}\|_2^2$$

where $\alpha$ is a weight factor. Equation 15 may be minimized by Gibbs sampling, which minimizes a function cyclically with respect to the coordinate variables. Finally, the corrected skeleton $CT_i$ given by $CT = ST_i^- + \lambda(ST_i)D_i$.

The above-described embodiments may help to provide more robust pose estimation than nearest neighbor or other methods, such as Gaussian process regressors and support vector regressors. Further, embodiments that perform skeletal correction, determination of the offset of joints may provide more robust determination of a corrected skeleton than regression an absolute joint position. It will be understood that parameters related to the learning of a random forest subspace regression function as disclosed herein, such as a number of trees and a leaf node size, may be selected to have any suitable values. Examples of suitable values include, but are not limited to, values of 10-50 trees and leaf node sizes of 1-20 bases.

In some embodiments, the above described methods and processes may be tied to a computing system including one or more computers. In particular, the methods and processes described herein may be implemented as a computer application, computer service, computer API, computer library, and/or other computer program product.

Figure 7:
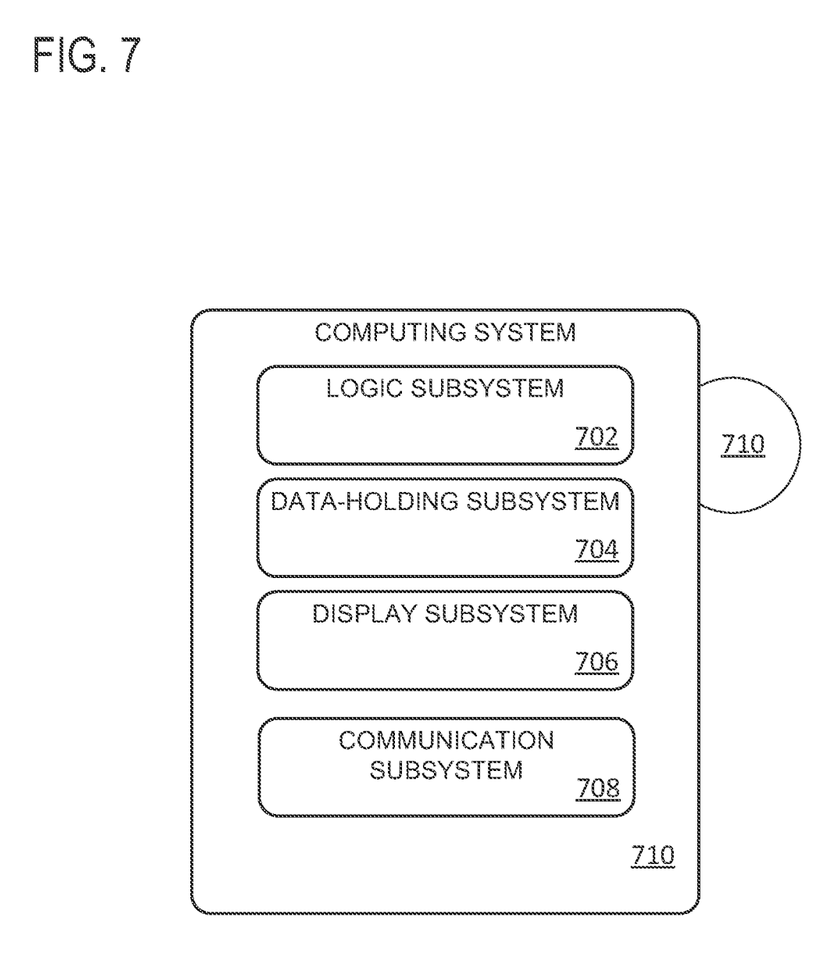
FIG. 7 shows an example embodiment of a computing system.

FIG. 7 schematically shows a nonlimiting computing system 700 that may perform one or more of the above described methods and processes. Computing system 700 is shown in simplified form. It is to be understood that virtually any computer architecture may be used without departing from the scope of this disclosure. In different embodiments, computing system 700 may take the form of a mainframe computer, server computer, desktop computer, laptop computer, tablet computer, home entertainment computer, network computing system, mobile computing system, mobile communication system, gaming system, etc.

Computing system 700 includes a logic subsystem 702 and a data-holding subsystem 704. Computing system 700 may optionally include a display subsystem 706, communication subsystem 708, and/or other components not shown in FIG. 7. Computing system 700 may also optionally include user input devices such as keyboards, mice, game controllers, cameras, microphones, and/or touch screens, for example.

Logic subsystem 702 may include one or more physical devices configured to execute one or more instructions. For example, logic subsystem 702 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Logic subsystem 702 may include one or more processors that are configured to execute software instructions. Additionally or alternatively, logic subsystem 702 may include one or more hardware or firmware logic machines configured to execute hardware or firmware instructions. Processors of logic subsystem 702 may be single core or multicore, and the programs executed thereon may be configured for parallel or distributed processing. Logic subsystem 702 may optionally include individual components that are distributed throughout two or more devices, which may be remotely located and/or configured for coordinated processing. One or more aspects of logic subsystem 702 may be virtualized and executed by remotely accessible networked computing systems configured in a cloud computing configuration.

Data-holding subsystem 704 may include one or more physical, non-transitory, devices configured to hold data and/or instructions executable by logic subsystem 702 to implement the herein described methods and processes. When such methods and processes are implemented, the state of data-holding subsystem 704 may be transformed (e.g., to hold different data).

Data-holding subsystem 704 may include removable media and/or built-in devices. Data-holding subsystem 704 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 704 may include devices with one or more of the following characteristics: volatile, nonvolatile, dynamic, static, read/write, read-only, random access, sequential access, location addressable, file addressable, and content addressable. In some embodiments, logic subsystem 702 and data-holding subsystem 704 may be integrated into one or more common devices, such as an application specific integrated circuit or a system on a chip.

FIG. 7 also shows an aspect of the data-holding subsystem in the form of removable computer-readable storage media 710, which may be used to store and/or transfer data and/or instructions executable to implement the herein described methods and processes. Removable computer-readable storage media 710 may take the form of CDs, DVDs, HD-DVDs, Blu-Ray Discs, EEPROMs, and/or floppy disks, among others.

It is to be appreciated that data-holding subsystem 704 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

When included, display subsystem 706 may be used to present a visual representation of data held by data-holding subsystem 704. As the herein described methods and processes change the data held by the data-holding subsystem, and thus transform the state of the data-holding subsystem, the state of display subsystem 706 may likewise be transformed to visually represent changes in the underlying data. Display subsystem 706 may include one or more display devices utilizing virtually any type of technology. Such display devices may be combined with logic subsystem 702 and/or data-holding subsystem 704 in a shared enclosure, or such display devices may be peripheral display devices.

When included, communication subsystem 708 may be configured to communicatively couple computing system 700 with one or more other computing systems. Communication subsystem 708 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 700 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On a computing system, a method of obtaining a representation of a pose of articulated object from depth image data capturing the articulated object, the method comprising:
   receiving the depth image data;
   obtaining an initial estimated skeleton of the articulated object from the depth image data;
   applying a random forest subspace regression function to the initial estimated skeleton;
   determining the representation of the pose based upon a result of applying the random forest subspace regression to the initial estimated skeleton.

2. The method of claim 1, wherein the representation of the pose comprises a corrected skeleton.

3. The method of claim 2, wherein determining the corrected skeleton comprises determining an offset to be applied to the initial estimated skeleton, and then applying the offset to the initial estimated skeleton.

4. The method of claim 2, wherein applying the random forest subspace regression to the initial estimated skeleton comprises scaling the initial estimated skeleton.

5. The method of claim 4, wherein scaling the initial estimated skeleton comprises normalizing the initial estimated skeleton based upon a subset of edges between joints of the initial estimated skeleton.

6. The method of claim 1, wherein the representation of the pose comprises a pose tag representing a location of the articulated object along a movement pathway.

7. The method of claim 6, wherein the pose tag comprises a value in a range of 0 to 1.

8. The method of claim 1, wherein applying the random forest subspace regression further comprises applying a temporal constraint.

9. The method of claim 1, wherein applying a random forest subspace regression function to the initial estimated skeleton comprises applying a plurality of random forest subspace regressions in a cascading manner.

10. The method of claim 1, wherein the random forest subspace regression function comprises a plurality of leaf nodes each comprising a set of bases that sparsely represent a subspace at the leaf node.

11. The method of claim 10, wherein each leaf node comprises between three and ten bases.

12. A computing system comprising:
   a logic subsystem; and
   a data-holding subsystem comprising instructions stored thereon that are executable by the logic subsystem to:
   receive depth image data from a depth image sensor;
   obtain an initial estimated skeleton from the depth image data, the initial estimated skeleton comprising a plurality of initial estimated joints;
   apply a regression function to the initial estimated skeleton to determine one or more offsets to apply to a corresponding one or more initial estimated joints of the initial estimated skeleton; and
   apply the offset to the initial estimated skeleton to determine a corrected skeleton.

13. The computing system of claim 12, wherein the instructions are executable to normalize the initial estimated skeleton based upon a subset of edges between joints of the initial estimated skeleton.

14. The computing system of claim 12, wherein the regression function comprises a random forest subspace regression function.

15. The computing system of claim 14, wherein the random forest subspace regression function comprises a plurality of decision trees having leaf nodes that each comprises a set of bases that sparsely represents a subspace at the leaf node.

16. The computing system of claim 12, wherein the instructions are executable to apply the random forest subspace regression function to the initial estimated skeleton by applying a plurality of random forest subspace regressions in a cascading manner.

17. The computing system of claim 16, wherein the instructions are executable to assign a pose tag comprising a value in a range of 0 to 1.

18. The computing system of claim 16, wherein the instructions are further executable to apply the random forest subspace regression by applying a temporal constraint.

19. The computing system of claim 16, wherein each leaf node comprises of the random forest subspace regression function comprises between three and ten bases.

20. A computing system comprising:
a logic subsystem; and
a data-holding subsystem comprising instructions stored thereon that are executable by the logic subsystem to:
receive depth image data from an image sensor;
obtain an initial estimated skeleton from the depth image data, the initial estimated skeleton comprising a plurality of initial estimated joints;
apply a random forest subspace regression function to the initial estimated skeleton to determine a pose tag to apply to the initial estimated skeleton, the random forest subspace regression function comprising a plurality of decision trees having leaf nodes that each comprises a set of bases that sparsely represents a subspace at the leaf node; and
output to a display an avatar having a pose based upon the pose tag determined.

* * * * *